Patented Apr. 28, 1925.

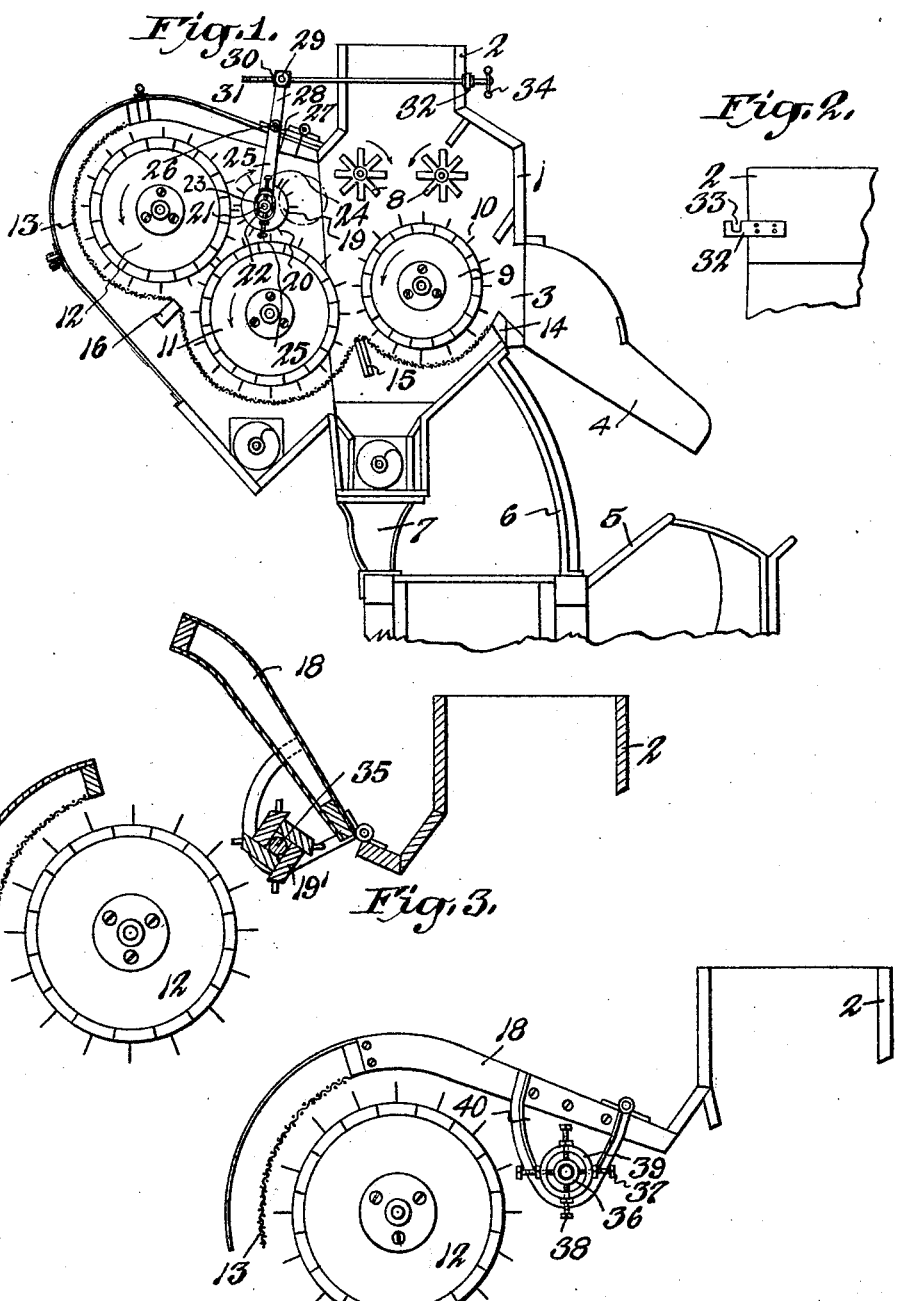

1,535,136

UNITED STATES PATENT OFFICE.

JOHN ARNOLD STREUN, OF SHERMAN, TEXAS, ASSIGNOR TO HARDWICKE-ETTER COMPANY, OF SHERMAN, TEXAS.

ADJUSTABLE AGITATOR FOR COTTON CLEANERS.

Application filed May 2, 1924. Serial No. 710,543.

*To all whom it may concern:*

Be it known that I, JOHN ARNOLD STREUN, a citizen of the United States, residing at Sherman, Grayson County, Texas, have invented a certain new and useful Improvement in Adjustable Agitators for Cotton Cleaners, of which the following is a specification.

My invention relates to feeder cleaners employed in the ginning of cotton. It has particular reference to the agitating means through which the seed cotton is efficiently broken up and distributed so as to allow the separating out of the dirt and trash before said cotton is fed to the gin.

It is an object of the invention to provide in such a feeder cleaner an adjustable agitating roll which may be arranged at various points relative to the picker cylinders to accommodate different grades and conditions of seed cotton.

My invention constitutes an improvement upon the type of feeder cleaner disclosed in my Patent, No. 1,473,059 granted November 6, 1923.

In the drawings herewith, I have shown several modifications of my invention. Like numerals of reference are employed to describe like parts in all the views so far as possible.

Fig. 1 is a side elevation of a feeder cleaner employing my invention, one side of the casing thereof being removed to show the interior of said casing. Fig. 2 is a detail of the support for the adjusting rod. Fig. 3 is a broken detail partly in section illustrating the agitator roll as attached to the door. Fig. 4 is a broken detail of the upper part of the casing showing the side of said casing removed for greater clearness.

The feeder cleaner shown in Figs. 1 and 2 is constructed in the manner disclosed in my prior patent above referred to, with the exception of the adjustment of the agitator rolls. There is shown a casing 1, having an upper hopper 2 into which the seed cotton is fed. Below the hopper and to one side is a discharge opening 3, leading to a chute 4 adapted to discharge the cotton to the gin 5. The casing is supported above the gin 5 by supporting standards 6 and 7 specially formed for this purpose.

Immediately below the hopper 2 are two oppositely rotating feeding rolls 8 adapted to compress the cotton into a compact bat. The cotton is received from said rolls upon a picker cylinder or roll 9 having radial teeth or pins 10 thereon to catch the cotton.

To the rear of the cylinder 9 are two auxiliary cylinders 11 and 12, the cylinder 12 being to the rear of and above the cylinder 11. All of the cylinders are journalled on shafts supported in the casing and are rotatable with said shafts in a counter clockwise direction, as seen in the drawing. They act to carry the cotton fed inwardly by the rolls 8 to the rear above the said cylinders and around below to be delivered to the discharge chute. A foraminated screen 13 is connected at its upper end at the rear of the cylinder 12 and extends around below each of the cylinders in a uniformly spaced relation relative to said cylinders and is connected at its forward end at 14 to a block forming the mouth of the chute. Between the adjacent cylinders the screen is supported by cross bars 15 and 16, respectively. The upper side of the casing adjacent the hopper has a door 18 therein which may be raised to expose the interior of the casing.

The agitator roll 19 is cylindrical in shape and has radial pins 20 thereon to engage the cotton. It is mounted for rotation in a clockwise direction as seen in Fig. 1. The shaft 21 upon which it is mounted is journaled in bearings 22 adjustably supported in a yoke 23 at each end, said bearings 22 being engaged on their upper and lower side by adjustable set screws 24, 25. The yoke 23 in which the set screws are mounted is supported at the lower end of swinging arms 25 on each side of the casing, said arms projecting above the door 18 and pivoted at 26 upon a shaft journaled in bearings 27 on the upper side of the door adjacent the hinged end thereof. The arms 25 are extended above the door at 28 to engage with the cross rod 29 upon which is mounted a nut 30 threaded to receive a rod 31 adjustable therein. The said rod extends along the side of the hopper and is supported at its forward end in a bracket 32 having a notch 33 therein to receive the rod.

A handle 34 on the forward end of the rod allows the rotation thereof for the adjustment of the roller. It will thus be noted that the position of the agitating roller may be adjusted vertically through the set screws 24 and may be adjusted laterally in an arc about the shaft 26 through the manipulation of the rod 31. The adjustment of this roller in the manner stated allows the distance between the agitator and the picker cylinders to be varied as desired, so as to give the cotton a greater or less amount of agitation to break up the cotton to accommodate the machine to the grade or condition of the cotton being operated upon.

In Figs. 3 and 4, the agitating roller 19' is slightly different in form than that disclosed in Fig. 1, and is mounted on a shaft 35, journaled at its ends in bearings 36 supported on its opposite sides by set screws 37 and 38. The two set screws 37 act to adjust the bearing in a horizontal direction while the set screws 38 may be employed to adjust the position vertically. The set screws are themselves supported in a collar 39 forming a part of brackets 40 connected on opposite sides of the door 18 closely adjacent the hinged ends thereof. By this means the position of the roller may be adjusted for short distances in any desired direction. The roller is also capable of being raised with the door out of the casing so as to give easier access to the interior of the casing, and to expose the roller for cleaning or repair. It will also be noted that the position of the agitator roll can be adjusted slightly through the elevation of the door 18, and I contemplate this adjustment where a larger range of adjustment is necessary than can be accommodated by the adjustment of the bearing in the manner described.

The cotton fed downwardly by the feeding rollers 8 in a compact mass or bat, as previously described, is engaged by the pins 10 upon the picker cylinder and carried to the rear upon the cylinder 11, which in turn carries it around toward the rear cylinder 12. On its passage from cylinder 11 to the cylinder 12 it is engaged also by the teeth of the agitator roll 19. The peripheral speed of the roller 19, is only about half the speed of the cylinders 11, so that the agitator serves to bank up the cotton and prevent the passage of large wads or locks of cotton in masses toward the rear of the casing, but serves to break it up and distribute the cotton so that it forms an even flow of the cotton over the screen 13. The position of the roller 19 may be adjusted so as to bring the pins or teeth thereon close to the cylinders 11 or 12, as desired, so that they may interfit to tear up bolls or wads of cotton in a most efficient manner. This is only necessary where bolly or wet cotton is being cleaned.

The adjustment of the roll is found to be a most important matter in that without changing the construction of the cleaner in any way except through the adjustment of this roll, the same cleaner may be adapted to act upon various grades and conditions of cotton, thus breaking it up and distributing it so that the dirt and trash may be easily eliminated in the passage of the cotton over the screen 13 on its way to the discharge chute 4 leading to the gin.

The advantages of this construction will be readily apparent to one skilled in the art without further description.

What I claim as new and desire to protect by Letters Patent is:

1. In a feeder cleaner for cotton, the combination with a casing, two feeder rolls and a plurality of picker cylinders in said casing, of an agitator roller positioned between two of said cylinders and a movable support for said roller in said casing, means on said support to adjust said roller thereon to various positions relative to both of said cylinders, whereby a greater or less amount of machining of the cotton as desired can be accomplished.

2. In a feeder cleaner for cotton, the combination of a casing, a plurality of picker cylinders, a screen below said cylinders, means to feed cotton to said cylinders, an agitator roller above and between two of said cylinders, a movable support for said roller, and means on said support to adjust said roller longitudinally of said support and to and from the cylinders for the purpose described.

3. In a feeder cleaner for cotton, the combination with a casing, a plurality of picker cylinders journalled in said casing for rotation in the same direction, a screen below said cylinders, and means to feed cotton gradually to said cylinders, of an agitator roller above said cylinders and supported on means adapted to swing relative to said cylinders, whereby the distance of said roller from said cylinders may be varied.

4. In a feeder cleaner for cotton, a casing, a hopper on the upper side thereof, a door adjacent said hopper, picker cylinders rotatable in said casing, means to feed cotton gradually to said cylinders, an agitator roller supported from said door and adjustable to and away from said cylinders, whereby the cotton may be forced through either a small or large passage between said roller and said cylinders for the purpose described.

5. In a feeder cleaner for seed cotton, a casing, an upper door therein, a plurality of picker cylinders in said casing, means to feed cotton to said cylinders, a screen below said cylinders, an agitator roller mounted rotatably in a bearing yoke suspended from said door, means to adjust said roller relative to said yoke, and means to regulate the position of said yoke and roller relative to said cylinders for the purpose described.

6. In a feeder cleaner for seed cotton, a casing, a door thereon, feed rollers, a plurality of picker cylinders rotatably mounted in said casing to rotate in the same direction to carry the cotton over and back under the same, an agitator roller supported on arms mounted to swing from said door, and means to swing said arms and move said roller to various positions relative to the said cylinders.

7. In a feeder cleaner for seed cotton, including a casing, picker cylinders therein, a screen below said cylinders, and means to feed cotton to said cylinders, the combination of an agitator roller above said cylinders, a swinging support for said roller and additional means to adjust said roller relative to said support.

In testimony whereof I hereunto affix my signature this 25 day of April, A. D. 1924.

JOHN ARNOLD STREUN.